United States Patent [19]

Roche et al.

[11] Patent Number: 5,300,349
[45] Date of Patent: Apr. 5, 1994

[54] FORMED BODIES CONSISTING OF GLASS AND PROVIDED WITH ELECTRIC CIRCUITS AND METHOD OF THEIR PRODUCTION

[75] Inventors: Guy Roche, Isle; Brigitte Delmon, Eyjeaux, both of France

[73] Assignee: Degussa Aktiengesellschaft, Frankfurt, Fed. Rep. of Germany

[21] Appl. No.: 987,727

[22] Filed: Dec. 8, 1992

[30] Foreign Application Priority Data

Dec. 9, 1991 [FR] France .................. 91 15219

[51] Int. Cl.$^5$ .............................. B32B 9/00
[52] U.S. Cl. ..................... 428/195; 427/108; 427/118; 427/269; 501/17; 219/203; 219/541; 219/543
[58] Field of Search ........ 427/108, 118, 269; 428/195; 501/17; 219/203, 541, 543

[56] References Cited

U.S. PATENT DOCUMENTS

| | | | |
|---|---|---|---|
| 3,441,516 | 4/1969 | Mulligan et al. | 501/17 |
| 4,721,845 | 1/1988 | Kunert et al. | 219/203 |
| 4,837,383 | 6/1989 | Andrews | 427/108 |
| 5,141,798 | 8/1992 | Chaumonot et al. | 428/195 |

FOREIGN PATENT DOCUMENTS 0377062 1/1989 European Pat. Off. .

*Primary Examiner*—Patrick J. Ryan
*Assistant Examiner*—Cathy K. Lee
*Attorney, Agent, or Firm*—Beveridge, DeGrandi, Weilacher & Young

[57] ABSTRACT

Formed bodies of glass, especially glass panes, are disclosed provided with electrically conductive circuits and with a colored appearance of the circuits upon looking through the glass and a method of their production. A layer of essentially pigments based on inorganic compounds is located between the optionally enamelled formed body of glass and the circuit which layer is connected via adhesive bridges of a vitrifying material to the formed body and to the circuits. The method of production is carried out by the application of a coating material which contains pigments and is free of vitrifying materials onto a formed body and (ii) the application of a conductive paste thereover containing a vitrifying material and (iii) a heat treatment.

12 Claims, 1 Drawing Sheet

FORMED BODIES CONSISTING OF GLASS AND PROVIDED WITH ELECTRIC CIRCUITS AND METHOD OF THEIR PRODUCTION

BACKGROUND OF THE INVENTION

The invention relates to formed bodies consisting of glass, especially glass panes, provided with electric strip conductors having a colored appearance of the electric circuits when viewed through the glass. In another aspect, the present invention relates to a method for production of the above formed bodies in which a colored layer and a conductive paste are applied in succession onto the optionally enamelled form body and the object obtained in this manner is subjected to a heat treatment.

The electrically conductive circuits or tracks on the rear windows of automobiles, antennas integrated into windshields and circuits for other purposes are obtained by means of the application of a paste based on noble metals, preferably silver, onto a formed body of glass and subsequently firing it in. After the firing, it can be determined upon looking through the glass that the color of the circuit varies from bright yellow to dark brown as a function of the state of the surface of the glass and of the firing temperature.

Various methods have been used with the goal of preventing this lack of homogeneity of color: Application onto the "tin" side of the float glass, adaptation of the firing temperature, and addition of pigments to the noble-metal pastes. None of these methods resulted in satisfactory results either as regards the appearance or on account of too great a change of the electric and mechanical properties; such as weldability of the tracks.

In order to avoid the phenomenon of the discoloration of the glass or of the enamel, which is caused by the thermo-activated migration of $Ag^+$ from the layer of the circuit into the glass or enamel, thus adversely affecting the appearance of the glass pane, an attempt was made, to the extent possible, to coat the silver-based circuit by applying the silver pastes onto highly pigmented glass enamels and/or ones containing compounds capable of blocking the $Ag^+$ migration.

U.S. Pat. No. 4,837,383 teaches that the migration of silver ions can be prevented by using an enamel consisting of a glass flux or paste based on a glass frit, and as pigments, elementary aluminum and/or lithium oxide as well as a vehicle or medium for the paste. Patent application EP-A 0,377,062 claims the improvement of the covering power of glass enamel over silver due to the addition of silicon, boron, carbon, lead and/or silver in their elementary form before making up the paste.

Such additives are not completely satisfactory for obvious reasons of cost (silver), on account of the special processing conditions conditioned by the addition of strongly reducing elements such as silicon or boron, for reasons of stability vis-à-vis acids (lithium) and of toxicity (lead). In addition, in spite of the aesthetic aspect which a complete coating of the silver circuit by a glass enamel would represent, the colors of these glass enamels are limited to a few black and gray tones.

SUMMARY OF THE INVENTION

An object of the present invention is to make available formed bodies consisting of glass, especially glass panes, and provided with electrically conductive circuits, which circuits exhibit a colored appearance upon looking through the glass. The formed bodies of the invention should exhibit no undesired discolorations produced by Ag migration during the firing in of the circuits and during a thermal deformation. In addition, the circuits should be able to be colored not only gray or black but also in other colors in order to be able to utilize the circuits at the same for decorative purposes.

Another object of the invention is to provide a method for the production of the formed bodies in accordance with the invention. The method should not be more expensive than previously known methods of producing generic formed bodies and should be able to do without the use of auxiliary substances which are expensive or require special conditions. Moreover, various colors should be able to be obtained without negatively affecting the electrical and mechanical properties of the circuits or their weldability.

Formed bodies consisting of glass, especially glass panes, provided with electric circuits and with a colored aspect of the circuits upon looking through the glass were found which are characterized in that a layer formed essentially of pigments based on inorganic compounds is located between the optionally enamelled formed body of glass and the circuit which layer is connected via adhesive bridges of a vitrifying or glazing material to the formed body and to the circuits.

BRIEF DESCRIPTION OF THE DRAWING

The present invention will be further understood with reference to the drawing which shows an enlarged cross section view through a glass including the layer construction according to the invention.

DETAILED DESCRIPTION OF THE INVENTION

Figure 1:
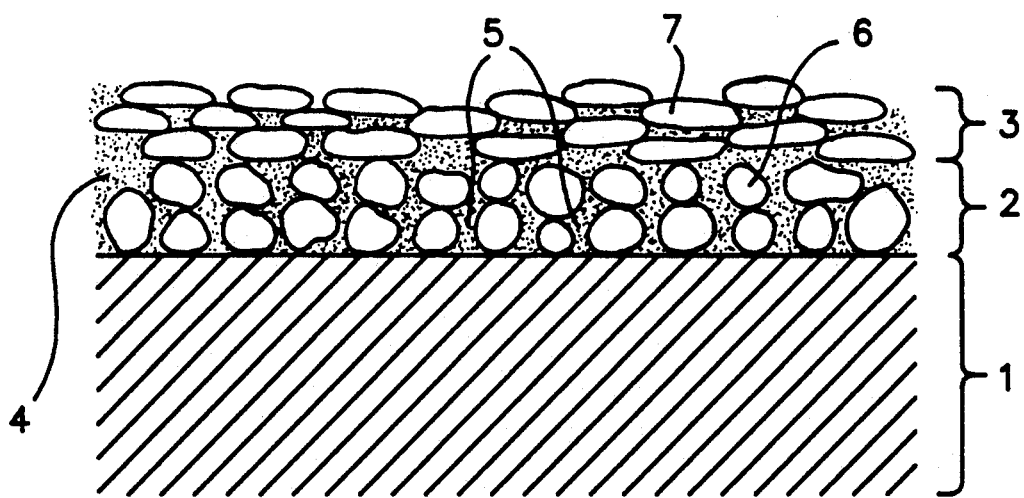

The circuits consist essentially of metals with high electric conductivity and are preferably based on noble metals or their alloys, especially on silver.

In principle, the pigment layer with the circuits on it can be located directly on the glass; however, it is also possible that a layer of enamel or glazing is located between the pigment layer and the glass. Such layers can be transparent and either colorless or colored, or opaque in such a manner that the pigment layer of the invention can still develop its decorative effect when the glass is looked through. To the extent that the entire glass surface is not coated by an enamel or a glazing for decorative purposes, the pigment layer is preferably located directly between the glass and the circuits.

The pigments are inorganic pigments, especially oxides, mixed oxides, sulfides of heavy metals which are stable under the conditions of firing in the pigment and the electrically conductive layer applied onto the formed body, that is, at approximately 500° to 800° C. So-called host lattice and inclusion pigments based on, for example, zirconium silicate can also be used. Selected pigments or pigment mixtures can be contained in the pigment layer. For black colors, e.g. mixed oxides based on chromium and copper or on chromium, iron, nickel and/or manganese are used. For grey colors, titanium or tin dioxide in addition to the black pigments are used. For blue colors, cobalt spinels; for green colors chromium oxide; for yellow to red colors lead-, antimony- or cadmium sulfides or selenides.

The pigment layer consists "essentially" of pigments; however, individual particles can be partially surrounded in a film-like manner by a vitrified material which also forms the adhesive bridges to the lower layer and to the electrically conductive layer. In contrast to previously known enamel layers for glass panes provided with circuits, such as shown in EP 0,377,062 A and U.S. Pat. No. 4,837,383, the pigment layer of the present invention generally contains more than 60% by weight, preferably more than 80% by weight pigments and less than 40% by weight, especially less than 20% by weight vitrifying material, which vitrifying material is essentially located in the adhesive bridges.

FIG. 1/1 shows a section through the subject matter of the invention which illustrates the layer construction. A pigment layer 2 consisting essentially of pigments 6 is located on the formed body of glass 1. Over this layer there is the electrically conductive circuit 3 with metal particles 7. The vitrifying material 4 forms adhesive bridges 5 between the track and the glass which bridges penetrate the pigment layer at some positions.

An advantageous method for producing the subject matter of the invention comprises the steps of:

(i) formation or a colored layer on an enamelled or non-enamelled formed body of glass, (ii) application of a conductive paste containing a metal powder and a vitrifying material in a liquid or liquefiable carrier material onto the colored layer; and (iii) heat treatment of the subject matter obtained in this manner at a temperature above the start of softening of the vitrifying material and below 800° C.

For the formation of the colored layer the formed body is coated at least on the positions provided for the circuits with a coating material containing pigments based on inorganic compounds and free of vitrifying materials.

According to a preferred embodiment of the invention the coating material containing pigments contains, in addition to the pigments, essentially one or several organic binders and, to the extent necessary, solvent for the binder.

According to a further embodiment of the invention, after the application of the coating material containing pigments onto the formed body the layer obtained is strengthened and hardened by evaporating the solvent contained therein, polymerizing or cross-linking the polymerizable binders and allowing fusible binders to harden by cooling off. The conditions used to form the layer will be a function of the composition of the coating material.

According to a further embodiment of the invention in those locations of the applied layer containing pigments which positions are not covered by circuits are subsequently removed after the heat treatment by a wash with water.

As already explained, glass panes, which can optionally also be enamelled, are preferably used as the formed bodies. The conductive paste which can be fired on to the glass preferably contains noble-metal powder as conductive particles, especially silver, in the form of extremely fine particles; i.e., microcrystalline particles and/or grains.

The vitrifying material of the conductive paste is generally a glass frit or a mixture of glass frits. Such glass frits are well known in the art. The selection of the glass frit(s) is performed by the person skilled in the art in a known manner as a function of the desired firing temperature and the viscosity behavior of the glass frit(s) at the firing temperature. The metal powder and the glass frit(s) are in homogeneous distribution in a liquid carrier medium in order to obtain a printable paste. The use of the conductive paste takes place by means of known printing pressure techniques, preferably by means of silk screen printing onto the pigment layer, which had been previously applied and strengthened in a suitable manner.

It was found that the use of a pigmented enamel containing special additives is not needed in order to form the colored layer, here the pigment layer. Rather, the pigment layer required in accordance with the invention is applied onto the formed body using a coating material free of vitrifying materials. The application of the pigment layer takes place on the total surface of the formed body provided for the circuits but at least at the locations provided for the circuits. The application of the pigment layer can be carried out by means of customary techniques known to the expert such as, for example, spraying, stamp printing or silk screen printing. Silk screen printing is preferred. The coating material containing pigments is accordingly generally liquid to pasty. Preferred coating materials contain, in addition to the pigments, essentially one or several organic binders and, to the extent necessary, solvents therefor. Customary auxiliary processing and/or printing agents can be present in a slight amount, if necessary as is known in the art. It is advantageous if the pigment content in the coating material constitutes more than 30% by weight to approximately 80% by weight.

Suitable binders are thermoplastic resins, including for example homo- and copolymers of acrylic and methacrylic-acid esters, hydrocarbon resins, cellulose resins, colophonium resins. Alkyl resins are also frequently a component of printing media. All of these are known in the art.

In order to obtain a printable consistency of the coating material containing pigments, solvents or mixtures of solvents known to the expert are used. Especially effective solvents for printing purposes are e.g. terpenoid hydrocarbons, viz. terpenes. In addition, however, aqueous solvent systems can also be used in printing media. The solvents also include polymerizable, especially photopolymerizable compounds with one and several double bonds. The following are cited here by way of example: Alkyl(meth)acrylates, alkoxyalkyl(meth)acrylates, hydroxyalkyl(meth)acrylates, alkeleneglycoldi(meth)acrylates, diaklyleneglycoldi(meth)acrylates, trimethylolpropane tri(meth)acrylate. Coating media containing polymerizable compounds contain one or usually several known photoinitiators for the purpose of photopolymerization, e.g. by means of UV illumination.

After the application of the pigment layer in liquid to pasty form, the latter is strengthened. The method of strengthening depends in a known manner on the solvents and binders present. Volatile solvents are volatilized by means of drying, in air, in an oven or by means of infrared radiators. This procedures renders the resulting pigment layer firm and pressure. Coating materials containing polymerizable compounds can be strengthened by means of UV-induced photopolymerization. Finally, coating materials containing binders which are solid at room temperature but fusible at moderately elevated temperature can be applied under heat and strengthened by cooling off.

The heat treatment of the formed body provided with the pigment layer and the circuit takes place in a customary manner known in the art of glass decoration. During the heating up but below the start of softening of the vitrifying material the entire organic component of the pigment layer decomposes, at which time the decomposition gases formed escape and a pure pigment layer remains between the glass and the conductor layer. The firing temperature at which the adhesive bridges of the vitrifying material between the conductor layer and the glass form and thereby fix the conductive layer and the pigment layer on the glass is usually between 550° C. and 760° C., especially between 630° C. and 680° C.

The heat treatment for firing the circuit can be combined with known measures for shaping and/or hardening the formed body of glass.

Wherever there is no circuit on the pigment layer, the pigment layer, which adheres only loosely here after the treatment, can be removed in a simple manner by washing it with water, optionally with a pressure jet.

The formed bodies of glass obtained in accordance with the method as explained above exhibit electric circuits which are colored in a uniform manner upon looking through the glass and do not allow the metal to shine through. The circuits thus serve at the same time to decorate the formed body of glass such as glass panes. The electric circuits exhibit the known electric and mechanical properties and can be readily welded or soldered.

It could not have been foreseen that the circuits adhere reliably on the pigment layer, which is fixed on the glass only by means of the adhesive bridges. Also, no usage of special additives, as was known in the case of previously known enamels, was needed in order to obtain covering, colored decorative layers under the circuits. As a result of the pigment layer consisting essentially of pigments and penetrated only by individual adhesive bridges of a vitrifying material, there is practically no more thermoactivated migration of Ag-+ions in the case of silver-based circuits into the glass of the formed body; this avoids a discoloration of the glass in the area below the pigment layer.

EXAMPLES

Pastes adjusted for silk-screen technology and consisting of the pigments indicated in the table in the indicated media (=binder+solvent+auxiliary substances) served as coating material. After the application of the pastes by means of silk screen printing and fixing in accordance with the indication in the table, a conductor layer was applied per silk screen printing using the indicated Ag conductive pastes capable of being fired. The heat treatment took place under the conditions indicated in the table. Finally, pigments were washed off from places not covered with a circuit.

TABLE

| Example No. | 1 | 2 | 3 | 4 | 5 |
| --- | --- | --- | --- | --- | --- |
| Coating Material | | | | | |
| Pigment (type) | ($Cr_2O_3$—CuO) | (CoO—$SiO_2$) | $Fe_2O_3$—$Cr_2O_3$—ZnO | ($Cr_2O_3$—CuO) | |
| Pigment (% by weight) | 50 | 50 | 30 | 50 | 50 |
| Medium (type) | EC 5* | EC 5* | EC 5* | 4462* | 80887* |
| Medium (% by weight) | 50 | 50 | 70 | 50 | 50 |
| Fixing of the pigment layer | Evaporation of the solvent by drying | | | thermo-plastic | UV-drying |
| Density of the pigment layer (μm) after drying | 25 | 25 | 20 | 40 | 35 |
| Ag conductive paste (type) | SP 1409* | Ag 574861/06* | | | |
| Thickness of the conductive layer (μm) | 15 | 15 | 15 | 25 | 15 |
| Heat Treatment | | | | | |
| Temperature (°C.) | 650 | 650 | 650 | 650 | 650 |
| Time (min.) | 3 | 3 | 3 | 3 | 3 |
| Color of the decoration | black | blue | brown | black | black |

*Product number of the commercial products of Degussa AG

Further modifications and variations of the foregoing will be apparent to those skilled in the art and are intended to be encompassed by the claims appended hereto.

French prior application 91 15219 is relied on and incorporated herein by reference.

We claim:

1. A formed body provided with electrically conductive circuits on glass consisting essentially of a formed body of glass which is optionally enamelled or glazed, a layer formed essentially of inorganic pigment which is located on the surface of said formed body of glass, and a layer of conductive material which is connected via adhesive bridges of a vitrifying material to said formed body of glass to thereby form an electrically conductive layer on said formed body of glass which has colored appearance when viewed through the glass; wherein said inorganic pigment layer contains more than 60% by weight of inorganic pigment and less than 40% by weight of said vitrifying material.

2. The formed body in accordance with claim 1, wherein said conductive layer consist essentially of silver or other noble metals or their alloys.

3. The formed body in accordance with claim 1, wherein the surface of the formed body adjacent the conductive layer is not enamelled.

4. The formed body in accordance with claim 1 which is a glass pane for automobiles.

5. The formed body in accordance with claim 1, wherein said inorganic pigment is selected from the group consisting of oxides, mixed oxides, and sulfides of heavy metals which are stable at approximately 50° to 800° C.

6. The formed body in accordance with claim 1, wherein said inorganic pigment is a mixed oxide based on chromium and copper or is based on chromium, iron, nickel and/or manganese.

7. The formed body in accordance with claim 6, wherein said inorganic pigment further comprises titanium or tin dioxide.

8. The formed body in accordance with claim 1, wherein said inorganic pigment is a cobalt spinel.

9. The formed body in accordance with claim 1, wherein said inorganic pigment is chromium oxide.

10. The formed body in accordance with claim 1, wherein said inorganic pigment is selected from the group consisting of lad, antimony, and cadmium sulfides or selenides.

11. The formed body in accordance with claim 1, wherein said inorganic pigment layer contains more than 80% by weight of inorganic pigment and less than 20% by weight of said vitrifying material.

12. The formed body in accordance with claim 1, wherein said formed body is produced by a method comprising:
(i) forming a colored layer on an optionally enamelled or glazed formed body of glass by coating at least partial locations for the circuit with a coating material containing inorganic pigment and free of vitrifying materials;
(ii) applying a conductive paste containing a metal powder and a vitrifying material in a liquid or liquefiable carrier material onto said colored layer; and
(iii) heat treating at a temperature above the start of softening of the vitrifying material and below 800° C.

* * * * *